UNITED STATES PATENT OFFICE.

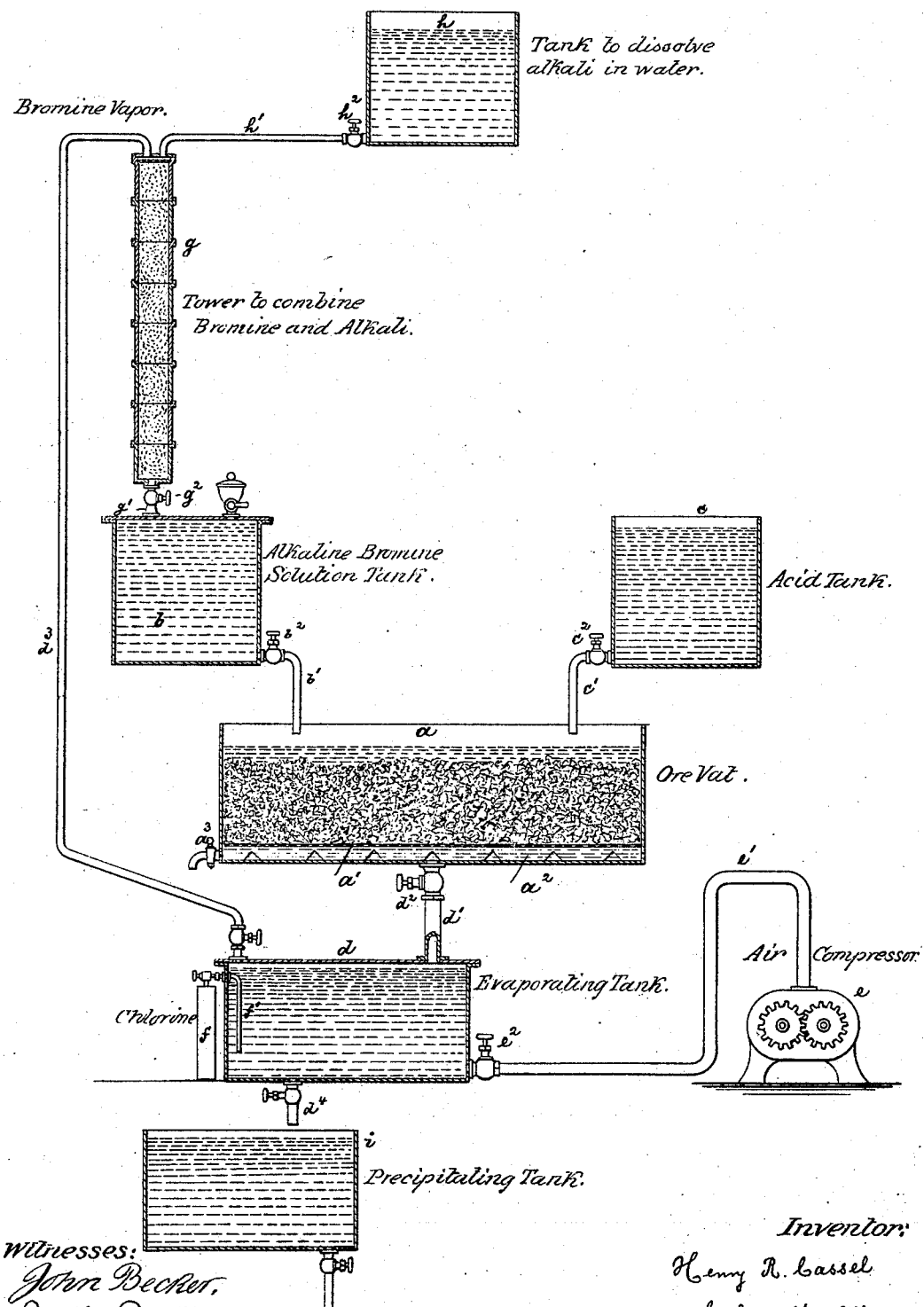

HENRY R. CASSEL, OF NEW YORK, N. Y.

PROCESS OF EXTRACTING GOLD FROM ORES.

SPECIFICATION forming part of Letters Patent No. 578,720, dated March 16, 1897.

Application filed September 10, 1896. Serial No. 605,345. (No specimens.)

*To all whom it may concern:*

Be it known that I, HENRY R. CASSEL, a citizen of the United States, and a resident of New York, in the county of New York and State of New York, have invented certain new and useful Improvements in Processes of Extracting Gold from Ores, of which the following is a specification.

This invention relates to a new process of extracting gold from ores by which the ore can be subjected to the action of a nascent solvent in open vats.

It is well known that aqueous chlorin and bromin solutions evolve noxious fumes, which make their use as solvents in open vats impracticable. I have found that by combining the bromin with an alkaline base I produce a solvent which will not only retain its power to dissolve gold for a long time during storage, but may be employed in open vats without giving off any noxious fumes. Thus a very important advance in the art is effected, as bromin in the nascent or active state is an excellent and very rapid solvent for the gold.

The accompanying drawing represents a sectional elevation of one form of apparatus for carrying my invention into effect.

The letter $a$ represents a vat adapted for the reception of the auriferous ore and provided with a perforated false bottom or filter $a'$.

$b$ is an alkaline-bromin-solution tank which communicates with vat $a$ by pipe $b'$, having cock $b^2$.

$c$ is an acid-tank which is used in some cases, and which also communicates with vat $a$ by pipe $c'$, having cock $c^2$.

The filtering-chamber $a^2$ of vat $a$ communicates with an evaporating-tank $d$ by pipe $d'$, having cock $d^2$. Into the tank $d$ an evaporating medium, such as compressed air or steam, may be introduced. In case air is used it is injected by compressor $e$ through pipe $e'$, having cock $e^2$. Tank $d$ may also communicate by pipe $f'$ with a cylinder $f$, containing chlorin, or the chlorin may be generated directly in tank $d$.

$d^3$ is a pipe that connects the tank $d$ with a tower $g$, containing pebbles or other obstructive bodies, and which in turn by pipe $g'$, having cock $g^2$, connects with tank $b$. A tank $h$, adapted to contain a solution of an alkali in water, connects with tower $g$ by pipe $h'$, having cock $h^2$. A discharge-cock $d^4$ of tank $d$ delivers the solution into a precipitating or receiving vessel $i$.

In carrying out my process by means of the apparatus described I proceed as follows: In starting the operation the tank $b$ is charged with a solution of an alkali, such as sodium or potassium hydroxid and bromin, to form an alkaline-bromin solution, by which I mean a solution of a bromin compound of an alkaline base. In preparing the mixture I take, if caustic soda is used, about one part of this hydroxid dissolved in water for two parts of bromin; but the strength of the solution depends of course upon the character of the ore under treatment and can be regulated to any degree desired. The characteristic property of this solution is that it does not, even for a long time, lose its solvent power in open storage vessels, and that when its bromin is brought into a nascent or active state while in intimate contact with the ore it will rapidly dissolve the gold.

The reaction between the alkali and bromin is as follows:

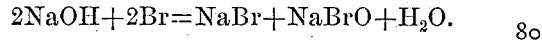
$$2NaOH + 2Br = NaBr + NaBrO + H_2O.$$

On heating or on long standing the following reaction takes place:

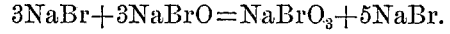
$$3NaBr + 3NaBrO = NaBrO_3 + 5NaBr.$$

The vat $a$ is charged with pulverized ore. Dilute acid, such as sulfuric acid of about 10° Baumé, is then admitted from tank $c$ and allowed to percolate through the ore, so as to moisten the same thoroughly and to render it acid. After the acid has percolated through the ore and the excess discharged through tap $a^3$ the cock $c^2$ is closed and cock $b^2$ is opened, gradually admitting a sufficient amount of alkaline-bromin solution to keep the ore submerged, the ore remaining in a quiescent state. This solution in slowly percolating through the moist acid ore is decomposed, the alkali combining with the acid and setting free the bromin in the nascent state or in the form of oxyacids. This bromin being in intimate contact with the ore exerts a powerful dissolving action upon the gold. While the bromin is thus set free in the body of the ore, the ore itself remains covered with a stratum of the alkaline-bromin solution, so that no fumes can possibly escape, and consequently open vats can be employed in lieu of the cumbersome rotating barrels of limited capacity which were heretofore indispensable in bromin or chlorin processes.

In those cases where the ore itself contains acids or acid salts the strength of the acid solution may be proportionately reduced or the acid omitted altogether.

The bromin solution is allowed to remain in contact with the ore for a time sufficient to dissolve the gold, when cock $b^2$ is closed. The solution is now allowed to run into the evaporating-tank $d$ and water is poured over the ore to thoroughly wash out the gold and bromin solution retained in the interstices of the ore. The tank $d$ will now contain the gold and the free bromin in solution, as well as the bromid salts formed during the operation. To set free the combined bromin, I now introduce into the solution chlorin from cylinder $f$, which will displace the bromin from its salts. Instead of chlorin any other reagent capable of setting free the bromin may of course be employed. All the bromin being now free, steam or air under pressure is injected into tank $d$, so that the bromin is vaporized and is driven through pipe $d^3$ into the tower $g$. If air alone is employed, the vaporizing process may be accelerated by heating the solution in tank $d$.

Within the tower $g$ the bromin vapors meet a subdivided stream of an alkaline solution of regulated quantity and strength, admitted from tank $h$ through pipe $h'$, and the two combine to form a fresh body of alkaline-bromin solution. This solution runs from the tower $g$ into the storage-tank $b$, from whence it is admitted into vat $a$ to treat a fresh charge of ore.

It will be seen that as the bromin is always employed over again for continuous use it is only necessary to mix bromin with the alkaline solution in tank $b$ at the beginning of the operation or when the slight losses that may in time occur require to be replaced.

After the bromin has been expelled from tank $d$ the gold solution is drawn off into the precipitating-tank $i$, where the gold is precipitated by hydrogen sulfid or in other manner. The precipitate is then collected, calcined, and melted into ingots.

It will be seen that by this process I obtain the following important advantages:

I provide a solution of any desired strength and which is capable of giving off nascent bromin in intimate contact with the ore.

I am enabled to dissolve gold in ores by nascent bromin in open vats and in an exceedingly short time.

No fumes are given off by the solution during storage or during the operation. Finally, I provide a continuous nascent-bromin process in which practically none of the bromin is lost and practically all the gold is recovered.

What I claim is—

1. The process of extracting gold from ores which consists in gradually percolating a solution of a bromin compound of an alkaline base capable of being decomposed by an acid, through a body of ore containing a suitable percentage of a substance having acid properties, the ore being maintained in a quiescent state during such percolation, substantially as specified.

2. The process of extracting gold from ores which consists in gradually percolating a solution of a bromin compound of an alkaline base capable of being decomposed by an acid, through a body of ore containing a suitable percentage of a substance having acid properties, the ore being maintained in a quiescent state during such percolation, and covering the ore during the treatment by a layer of a liquid capable of absorbing any bromin fumes that may arise from the ore, substantially as specified.

3. The process of treating auriferous ores which consists in subjecting the ore to the action of a solution of a bromin compound of an alkaline base, so as to form active bromin in the body of the ore, setting free the combined bromin, vaporizing the bromin, mixing it with a subdivided body of a solution of an alkali, and precipitating the gold, substantially as specified.

Signed at New York, in the county of New York and State of New York, this 1st day of September, A. D. 1896.

HENRY R. CASSEL.

Witnesses:
F. v. BRIESEN,
WILLIAM SCHULZ.